United States Patent
Hosono et al.

(10) Patent No.: US 6,633,419 B2
(45) Date of Patent: Oct. 14, 2003

(54) PRODUCTION METHOD AND DEVICE FOR HOLOGRAM

(75) Inventors: Hideo Hosono, Yamato (JP); Masahiro Hirano, Tokyo (JP); Nobuhiko Sarukura, Okazaki (JP); Kenichi Kawamura, Sagamihara (JP)

(73) Assignee: Japan Science and Technology Corporation, Kawaguchi (JP)

( * ) Notice: Subject to any disclaimer, the term of this patent is extended or adjusted under 35 U.S.C. 154(b) by 224 days.

(21) Appl. No.: 09/890,274

(22) PCT Filed: Dec. 14, 2000

(86) PCT No.: PCT/JP00/08883
§ 371 (c)(1),
(2), (4) Date: Nov. 9, 2001

(87) PCT Pub. No.: WO01/44879
PCT Pub. Date: Jun. 21, 2001

(65) Prior Publication Data
US 2002/0126333 A1 Sep. 12, 2002

(30) Foreign Application Priority Data
Dec. 17, 1999 (JP) .......................... 11-359815
Oct. 12, 2000 (JP) .......................... 2000-312715

(51) Int. Cl.$^7$ ................................ G03H 1/04
(52) U.S. Cl. ................................ 359/35; 359/27
(58) Field of Search ................ 359/1, 27, 35; 219/121.6

(56) References Cited

U.S. PATENT DOCUMENTS 5,786,560 A * 7/1998 Tatah et al. ............ 219/121.77

FOREIGN PATENT DOCUMENTS

| JP | 7-63939 | 3/1995 |
| JP | 11-231151 | 8/1999 |
| JP | 11-267861 | 10/1999 |
| JP | 2000-33263 | 2/2000 |
| JP | 2000-56112 | 2/2000 |
| JP | 2000-249859 | 9/2000 |

OTHER PUBLICATIONS

Vainos et al., "Excimer laser for microetching computergenerated holographic structures", □□Applied Optics, vol. 35, No. 32 Nov. 10, 1996), pp. 6304–6318.*
Ken–ichi Kawamura et al.; Jpn. J. Appl. Phys., vol. 39, Part 2, No. 8A, pp. L767–L769; Aug. 2000.
Harvey M. Phillips et al; Optical Engineering, vol. 32, No. 10, pp. 2424–2436, Oct. 1993.
N. P. Barry et al.; SPIE, vol. 3176, pp. 304–313., Sep. 1996.
A.M. Ozkan et al.; Applied Physics Letter, vol. 75, No. 23, pp. 3716–3718, Dec. 1999.
E. N. Glezer et al; Applied Physics Letters—vol. 71, Issue 7, Aug. 1997.
K. Miura et al.; Applied Physics Letters—vol. 71, Issue 23, Dec. 1997.

* cited by examiner

Primary Examiner—Mark A. Robinson
Assistant Examiner—Alessandro V. Amari
(74) Attorney, Agent, or Firm—Armstrong, Westerman & Hattori, LLP

(57) ABSTRACT

A method and apparatus for producing a hologram using a two-beam laser interference exposure process, comprising the steps of using as a light source a femtosecond laser having a pulse width of 900–10 femtoseconds and a peak output of 1 GW or more and capable of generating a pulse beam at or close to the Fourier transform limit, dividing the pulse beam from the laser into two by a beam splitter, controlling the two beams temporally through an optical delay circuit and spatially using plane and concave mirrors each having a slightly rotatable reflection surface to converge the beams on a surface of or within a substrate for recording a hologram at an energy density of 100 GW/cm$^2$ or more with keeping each polarization plane of the two beams in parallel so as to match the converged spot of the two beams temporally and spatially, whereby a hologram is recorded irreversibly on the substrate formed of a transparent material, semiconductor material or metallic material.

21 Claims, 7 Drawing Sheets

PRODUCTION METHOD AND DEVICE FOR HOLOGRAM

TECHNICAL FIELD

The present invention relates to the technology of holograms, and more particularly to a method and apparatus for efficiently producing a hologram having excellent embedability with a microscopic surface area and thickness thereof, high diffraction efficiency and therefore enhanced applicability to various recording substrates. The present invention also relates to a product incorporating such a hologram.

BACKGROUND ART

High energy density no fewer than 1 TW ($10^{12}$W)cm$^3$ may be obtained by a femtosecond laser. When a light having such a high energy density is irradiated onto a material, high-density electrons will be excited in a short time period in the irradiated material. The energy of the excited electrons is converted into the vibrational energy of ions in the material within one nanosecond. Once the vibration energy density exceeds a given threshold, the ions break away from the material, resulting in an abrasion of the material. The abrasion caused in the material generates microscopic holes, and thereby the effective refractive index of the material is locally varied. This phenomenon is referred to as "micro-abrasion". In this connection, when the vibration energy density is slightly lower than the threshold at which a destruction or abrasion is caused in the material, the material will not go far enough to be destroyed but will cause a variation in the refractive index of the material in connection with a variation or structural change in the atomic arrangement of the material.

It has been known to irradiate a high peak energy femtosecond laser beam to be converged at a spot having a small area onto a transparent crystal material, such as silica glass, BK7 optical glass, plastic (acrylic), quartz crystal, or sapphire, to cause an abrasion in the material so as to create fine holes, or to form micropores within the material through a nonlinear refractive index effect, or to vary the refractive index of the material through the structural change of atomic arrangement in the material.

For example, E. N. Glezer and E. Hazur: Appl. Phys. Lett. 71,882, (1997), and K. Miura, J. Qie, H. Inoue, T. Mitsuya and K. Hirano: Appi. Phys. Lett. 71,3329, (1997) reports that an optical waveguide may be formed by increasing the refractive index at an arbitrary location in an amorphous material such as silica glass. Japanese Patent Laid-Open Publication No. Hei 11-267861 discloses a method for forming a marking in a glass material. It has also been known to produce a diffraction grating by forming a number of spots in a regular arrangement using a device for irradiating a femtosecond laser beam onto a transparent material.

However, the application of this production method of diffraction gratings to actual elements and apparatuses involves unacceptable insufficiency. Further, limited few materials may vary the refractive index therewithin. In particular, as to a diamond crystal, any variation of the refractive index has not been achieved by this method.

The practical application of a titanium-sapphire laser has opened a way to obtain a femtosecond laser beam having a high coherence. Heretofore, it has been reported that when a femtosecond laser beam was irradiated onto a thin-film material formed of diamond or the like, a ripple pattern and/or a so-called Newton ring phenomenon caused likely by pulse interference were recorded in the material (A. M. Ozkan et al; Appl. Phys. Lett. 75,3716, (1999)), and this has suggested the coherence of the femtosecond laser beams. However, the reason for generating such a microstructure has not been clarified. Further, it has not been positively attempt to take advantage of the coherence of the titanium-sapphire laser.

A hologram has been conventionally produced through a two-beam exposure optical system by use of a gas laser output a high coherent continuous beam, and a recording substrate formed of a photosensitive organic substance or inorganic compound. However, the low energy density of such a gas laser has led to unmercifully long recording time and has forced to limitedly use a recording substrate having high photosensitivity. While a pulse laser, such as a ruby laser, has been used to cut down the recording time, it is indispensably required to combinationally use the photosensitive material as the recording matrix or substrate. In addition, it has been difficult to produce an embedded type hologram or a microhologram having a surface area of about 100 µm diameter or less.

DISCLOSURE OF INVENTION
Means for Solving the Problem

Heretofore, no report on a development of the two-beam exposure apparatus has been made, partially because it has been not clear if the coherence of the conventional femtosecond laser beam could be maintained sufficiently to enable the hologram recording. For example, a pulse beam having a pulse width of 100 femtoseconds is a short duration equivalent to a distance of only 30 µm, and its converged spot size is necessarily arranged in about 100 µm diameter in order to provide a high energy density. Further, the coherence of the high-density pulse can be degraded due to a nonlinear optical effect of a recording substrate during the propagation of the pulse through the substrate.

In view of the above conditions, the present invention provides a newly developed two-beam hologram exposure process in stead of the conventional laser beam irradiation process using the photosensitive material, to achieve a method capable of recording a hologram on a recording substrate essentially having no photosensitivity which is formed of a transparent organic or inorganic material, semiconductor material or metallic material, by use of a pair of pulse beams branched from a single pulse beam.

More specifically, according to the present invention, there is provided a method for producing a hologram using a two-beam laser interference exposure process comprising the steps of using as a light source a femtosecond laser having a pulse width of 900–10 femtoseconds and a peak output of 1 GW or more and capable of generating a pulse beam at or close to the Fourier transform limit, dividing the pulse beam from the laser into two by a beam splitter, controlling the two beams temporally through an optical delay circuit and spatially using both a mirror having a planar reflection surface (hereinafter referred to as "plane mirror") rotatable slightly or finely and a mirror having a concave reflection surface (hereinafter referred to as "concave mirror") rotatable slightly or finely to converge the beams on a surface of or within a substrate for recording a hologram at an energy density of 100 GW/cm$^2$ or more with keeping each polarization plane of the two beams in parallel so as to match the converged spot of the two beams temporally and spatially, whereby a hologram is recorded irreversibly on the substrate formed of a transparent material, semiconductor material or metallic material based on a variation in the configuration of the substrate and/or a variation in the refractive index of the substrate in connection with an abrasion of the substrate or a structural change in the atomic arrangement of the substrate caused by the high density energy irradiation.

Preferably, the light source includes a femtosecond laser having a pulse width of 500–50 femtoseconds and a peak output of 10 GW or more and, more preferably, capable of generating a pulse beam close to the Fourier transform limit. Preferably, the controlled beams are converged at an energy density of 1 TW/cm$^2$ or more. For example, given that the refractive index of the substrate is 1.5, a pulse width of 100 femtoseconds corresponds to a spatial distance of 20 $\mu$m and thereby provides a hologram having a total thickness of 10 $\mu$m or less. The position or range of the depth of the hologram may be controlled by changing at least one of optical path lengths of the two beams through the optical delay circuit, and the total thickness of the hologram may be adjusted by changing the pulse time of each beam.

A titanium-sapphire laser beam pulse may be generated substantially at the Fourier transform limit, and thereby has a significantly high coherence. When such a coherent beam is split into two beams and then the two beams are temporally matched with each other again without any degradation in coherence, an interference pattern having a clear contrast between dark and bright regions will be provided if each polarization plane of the two beams is parallel. Thus, when a threshold defined by the substrate is arranged between respective energy densities of the dark and bright regions, the interference pattern may be recorded as a relief pattern in the surface of the substrate or a variation in the refractive index of the substrate caused in connection with an micro-abrasion of the substrate or a structural change in the atomic arrangement of the substrate.

In the method for producing a hologram according to the present invention, the following process may be employed.

Each position of the mirrors may be finely moved in the vertical direction of each reflection surface of the mirrors and in the parallel and vertical directions of each incident beam, to vary each optical path length of the two beams so as to serve as the optical delay circuit.

A sum frequency from a nonlinear optical crystal, such as a BBO crystal, may be used to detect that the two femtosecond laser beams is matched with each other spatially and temporally. More specifically, when the collision point between two beams exists within the crystal, a sum frequency of the irradiated laser beams is generated by virtue of the nonlinear optical effect. From this point of view, the two beams may be matched spatially with each other within the BBO crystal and then matched temporally with each other by fine-adjusting the optical delay circuit to maximize the intensity of the sum frequency.

When the nonlinear optical crystal, such as a BBO crystal, is used as a material providing the non-linear optical effect, each phase of the two beams is necessary to be matched. This restricts an angle between the two beams, and this angle cannot be set large.

Air has a third order optical nonlinearity, and may be used as a material for detecting the spatial and temporal matching of the collision position of the two beams. When using a femtosecond laser having a wavelength of 880 nm, a Third Harmonic Generation (THG) or Third Sum-Frequency Generation (TSG) (wavelength: 266 nm) is generated base on the third order nonlinear coefficient. The intensity of THG or TSG is in proportion to the square value of the intensity of the associate beam. When two beams collide and interfere with each other, the resulting intensity of the bright region becomes four times greater than that of a single beam. Thus, the intensity of THG or TSG becomes sixty four-fold. This allows the spatial and temporal matching to be detected with an excellent sensitivity. In addition, using the third order nonlinear property of air allows the restriction of the angle between two angles to be eliminated.

The energy density of the beam to be converged in the substrate may be arranged just below a threshold at which an abrasion is caused in the substrate, to modulate the refractive index of the substrate itself with keeping the surface of the substrate in a flat or level configuration so as to form a surface type hologram.

In a silica glass, particular a silica glass including germanium, an optically induced structural change is cased by irradiating a laser beam having a relatively low energy density, resulting in the volumetric shrinkage of about 3%. With this phenomenon, the energy density of the beam to be converged onto the substrate may be arranged in the range of a threshold at which an structural change is optically induced in the substrate to a threshold at which an abrasion is caused in the substrate, so as to form a surface relief type hologram based on the volume change of the substrate in connection with the structural change of the substrate induced by the laser beam. Further, in the substrate, there is a difference in an etching rate with an acid solution between the structurally changed portion and another portion having no structural change. Thus, the substrate having the surface relief type hologram recorded therein may be etched with an acid solution to increase the depth of the surface relief and enhance the hologram diffraction efficiency.

The incident position and incident angle of the two beams each incident from the same direction into the substrate may be adjusted to form a transmission type hologram having an adjusted position in the depth direction of the substrate and an adjusted surface area.

A part of the laser beam irradiated from the air onto the substrate is reflected by the surface of the substrate based on the difference in the refractive index between the air and the substrate. As a result, due to an interaction with the reflected light in addition to a light absorbing action at the substrate surface, an additionally increased energy is absorbed in the substrate, and thereby the substrate surface is subject to abrasion. The reflection at the substrate surface may be cut out by immersing the substrate into a solution having a refractive index close to that of the substrate or by applying this solution onto the substrate, so as to cut out the abrasion to be cased in the substrate surface. The same effect may be obtained by coating an anti-reflection film on the substrate.

A converging position of the two beams opposedly incident into the substrate and a size of a converged spot of the beams may be arranged within the substrate by controlling the optical delay circuit and the mirrors, so as to form an embedded reflection type hologram embedded within the substrate and having an adjusted position in the depth direction of the substrate and an adjusted surface area, wherein the laser pulse time is further controlled to form an embedded reflection type hologram additionally having an adjusted total hologram thickness. In this case, the coherence of the femtosecond pulse is degraded during the propagation of the pulse through the substrate due to the nonlinear property of the substrate. Thus, a material having a lower nonlinear property may be used as the substrate or the energy density may be reduced as low as possible to provide an increase embedded depth of the hologram.

The in-depth position of the hologram within the substrate may be varied by controlling the converging position of the two beams opposedly incident into the substrate by use of the optical delay circuit and a condensing lens, to embed a plurality of holograms in the depth direction of the substrate, so as to provide a multiplex hologram recording medium.

The substrate may include a transparent crystal or glass having no inversion symmetry property. In this case, the substrate may be adjusted in temperature and quasi-phase-matched with applying an electric field to form a domain inverted grating.

The substrate may also include a material transparent to visible light selected from the group consisting of quartz, glass, sapphire, $LiNBO_3$, $LiTaO_3$, $ZrO_2$, $CaF_2$, diamond and acrylic resin, or a semiconductor material selected from the group consisting of silicon, Ge, GaAs, AlN, InP, GaN, ZnS, ZnSe, ZnO, SiC and any mixed crystal thereof. In this case, the formed hologram may be either one of a surface relief type hologram, a surface type hologram and a volume hologram.

The substrate may also include a metallic material selected from the group consisting of gold, silver, platinum, copper, nickel, chromium, aluminum, cadmium, tantalum and metal silicon, or a semiconductor material selected from the group consisting of silicon, Ge, GaAs, AlN, InP, GaN, ZnS, ZnSe, ZnO, SiC and any mixed crystal thereof. In this case, the formed hologram may be a surface relief type hologram.

Heretofore, the material for recording a hologram has been formed of a photosensitive organic substance or inorganic compound, and thereby involved with many restrictions. In contrast, according to the method of the present invention, a hologram is irreversibly recorded based on the abrasion or structural change of the substrate caused by high-density energy, and thereby almost any materials may be used as the substrate. Further, once the hologram is irreversibly recorded, the recorded hologram may be kept stably for a long term, and never be lost unless it is heated up to a temperature to cause the structural change in the atomic arrangement of the substrate itself.

Preferably, the substrate is kept under vacuum pressure during the exposure. Keeping the substrate under vacuum pressure may prevent particles and fine-powders caused by the abrasion from attaching on the substrate surface, and thereby allow the substrate surface to be kept in an unpolluted state. This may also provide a flat surface of the substrate in the embedded type hologram.

Further, according to the present invention, there is provided a hologram formed irreversibly in a transparent material, a semiconductor material or a metal surface by means of the aforementioned method.

Further, according to the present invention, there is provided a distributed Bragg reflector (DBR) type or distributed feedback (DFB) type leaser comprising a diffraction grating composed of a hologram obtained from the production method of the present invention, a laser medium selected from the group consisting of diamond, alumina, sapphire, and glass consisting of the composition including at least either one of $Al_2O_3$ and $SiO_2$, wherein the laser generates a beam based on an inherent emission yielded from exciton effects and optical inter-band transitions, an emission yielded from inherent defects, or an emission yielded from added impurities. More specifically, the DBR or DFB laser may be produced by forming a waveguide having a high refractive index in the matrix or substrate, and providing a light-emitting center or mechanism within the waveguide, followed by providing an embedded type hologram on each end of the waveguide.

Further, according to the present invention, there is provided an apparatus for producing a hologram, using the two-beam laser interference exposure process in the aforementioned method. This apparatus comprises a light source of a femtosecond laser, a beam splitter for dividing a pulse beam from the laser into two pulse beams, and an optical system including an optical delay circuit for temporally controlling a converging position of the pulse beams, plane and concave mirrors for spatially controlling the position, and a mechanism for finely rotating the mirrors. This apparatus may further include an aperture control element for shaping the laser beam into a Gaussian pulse to lower a threshold for forming the hologram.

The two-beam laser exposure apparatus is essentially required to have an optical system capable of being controlled positionally in micron scale. As an apparatus having a high-precision position control performance to cope with this requirement, the present invention provides an optical system including the optical delay circuit allowing a fine control and the plane and concave mirrors, with the function capable of detecting the converging position of the two beams, whereby the two beam may be converged on or within a substrate for recording the two beams as a hologram, with matching the converged spot of the two beams temporally and spatially.

The apparatus on the present invention employs a mirror optical component in terms of using the minimum number of transparent optical component. This allows any degradation of the coherence of the two beams to be eliminated. Further, in order to improve the interference between the two beams, each polarization plan of the two beams may be paralleled by adjusting the arrangement and number of the mirrors in each optical path.

BEST MODE FOR CARRING OUT THE INVENTION

Figure 1:
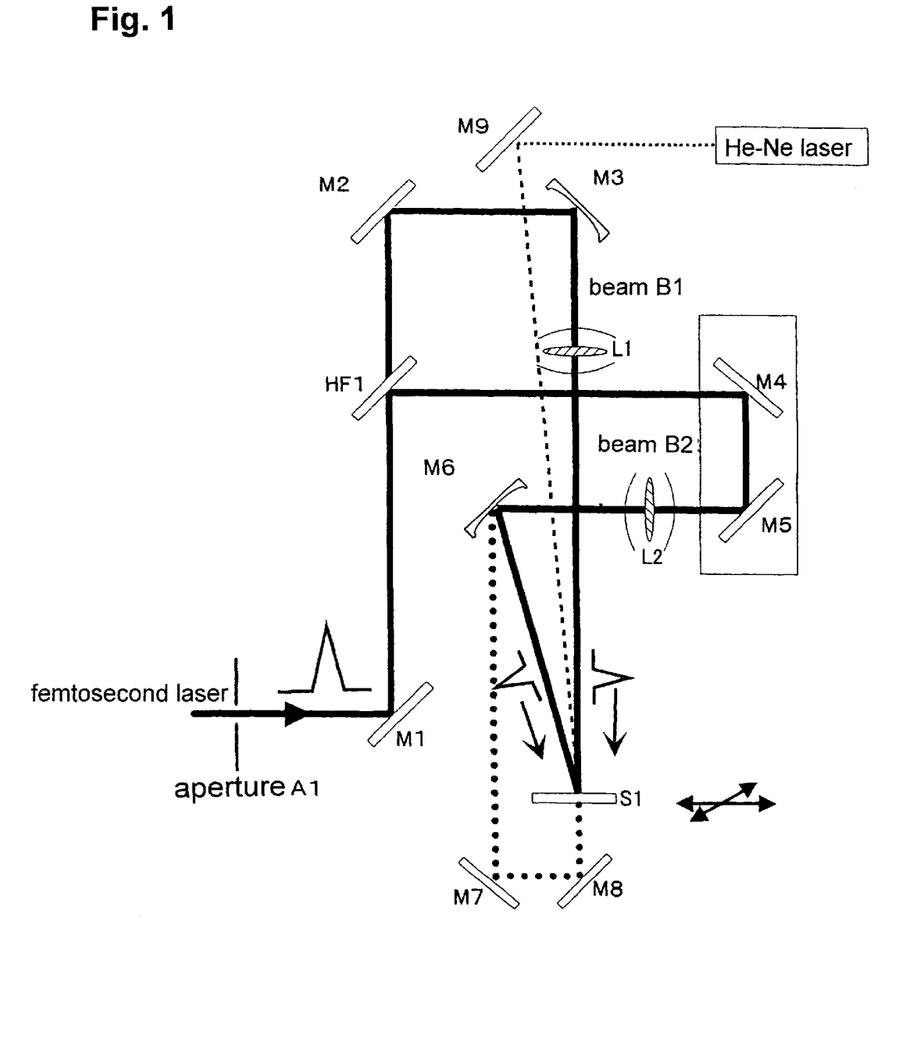
FIG. 1 is a conceptual diagram showing an optical system in a method and apparatus for producing a hologram using a two-beam laser exposure process according to the present invention.

FIG. 1 is a conceptual diagram showing an optical system of a method and apparatus for producing a hologram using a two-beam laser interference exposure process of the present invention. A laser beam irradiated from a light source of a femtosecond laser is reflected by a plane mirror M1, and is then divided into a beam B1 and a beam B2 by a half mirror HF1 used as a beam splitter. The beam B1 is reflected by a plane mirror M2 and a concave mirror M3, and is then converged on a surface of or within a substrate S1. A plane mirror M3' and a lens L1 having a thin thickness may be used as a substitute for the concave mirror M3. The beam B2 is reflected by a plane mirror M4 and a plane mirror M5. After reflected by a concave mirror M6, the beam B2 is converged on the surface of or within the substrate S1. A lens L2 and a plane mirror M6' may be used as a substitute for the concave mirror M6.

An optical path shown by solid lines is used for producing a transmission type hologram. For producing a reflection type hologram, an optical path shown by dotted bold lines is used. In this case, the beam reflected by the concave mirror 6 is converged within the substrate S1 through a plane mirror M7 and a plane mirror M8. The lens L2 and the plane mirror M6' may also be used as a substitute for the concave mirror M6. As shown by a thin-dotted line, a hologram forming process may be monitored by irradiating the substrate S1 with a He-Ne laser beam reflected by a plane mirror M9 and then acquiring the resulting reflected light.

The plain mirrors M4 and M5 serve as an optical delay circuit. Specifically, the plain mirrors M4 and M5 are finely moved at one-micron level using a micrometer caliper to adjust a difference in the optical path length between the beams B1 and B2 and thereby to make the converged spot of the two beams match temporally with each other. Further, the concave mirrors M3, concave mirror M6 or plane mirror M8 is finely rotated using a micrometer caliper to make a converging position of the two beams match spatially with each other. In order to prevent degradation in the coherence of the beams, the lenses L1 and L2 preferably have a fully reduced thickness and a long focal distance. In this arrangement, each polarization plane of the beams is parallel at the substrate S1. Each optical parameter of a formed diffraction grating, such as a fringe distance or a focal distance in the case of providing a lens function thereto, can be determined as in a conventional two-beam laser interference exposure process using a continuous beam.

The substrate S1 is placed on an X-Y stage, and is finely moved using a micrometer caliper to record a hologram having a fine area at a designated position of the substrate S1. In the production method of the present invention, one hologram may be recorded by a single pulse laser beam. Thus, a plurality of holograms may be recorded in a multiplexed or multilayered form by irradiating a plurality of pulses time-serially. If the substrate is positionally fixed during the time interval of two pulses, produced holograms are spatially superposed with each other. If each polarization plane of the laser beams is rotated at a given angle, each hologram to be superposedly formed will be rotated by the given angle. Particularly, when the polarization plane of one pulse is rotated at a 90-degree to that of the other pulse and these two pulses are irradiated time-serially, the resulting holograms will be superposed and shaped into a grid-like hologram. The same grid-like hologram may be formed by rotating the substrate at a 90-degree for one of the pulses instead of rotating the polarization plane.

Further, by moving the substrate in the X and Y directions, a hologram may be formed extensively over the surface of the substrate. Since the exposure time is significantly short, the substrate may be continuously moved. In particular, when the substrate is moved during the time interval of two pulses by one half of a fringe distance of a hologram recorded with a single pulse, a hologram having a substantially half fringe distance may be formed. In a femtosecond laser having a wavelength of 800 nm, a minimum fringe distance of a transmission type hologram with a single pulse is 400 nm. Thus, a hologram obtained from the method of the present invention may have a reduced fringe distance down to 200 nm. A femtosecond laser having a shorter wavelength may be advantageously used to reduce the fringe distance.

A suitable laser includes a regenerative amplification titanium-sapphire laser, which may be suitably arranged in an oscillation center wavelength of about 800 nm, a pulse width of about 100 femtoseconds, and a pulse energy of about 1 mj/pulse equivalent to a peak output of about 10 GW. Preferably, a converged spot size is about 100 $\mu$m diameter equivalent to a peak energy of about 100 TW/cm$^2$.

Figure 2:
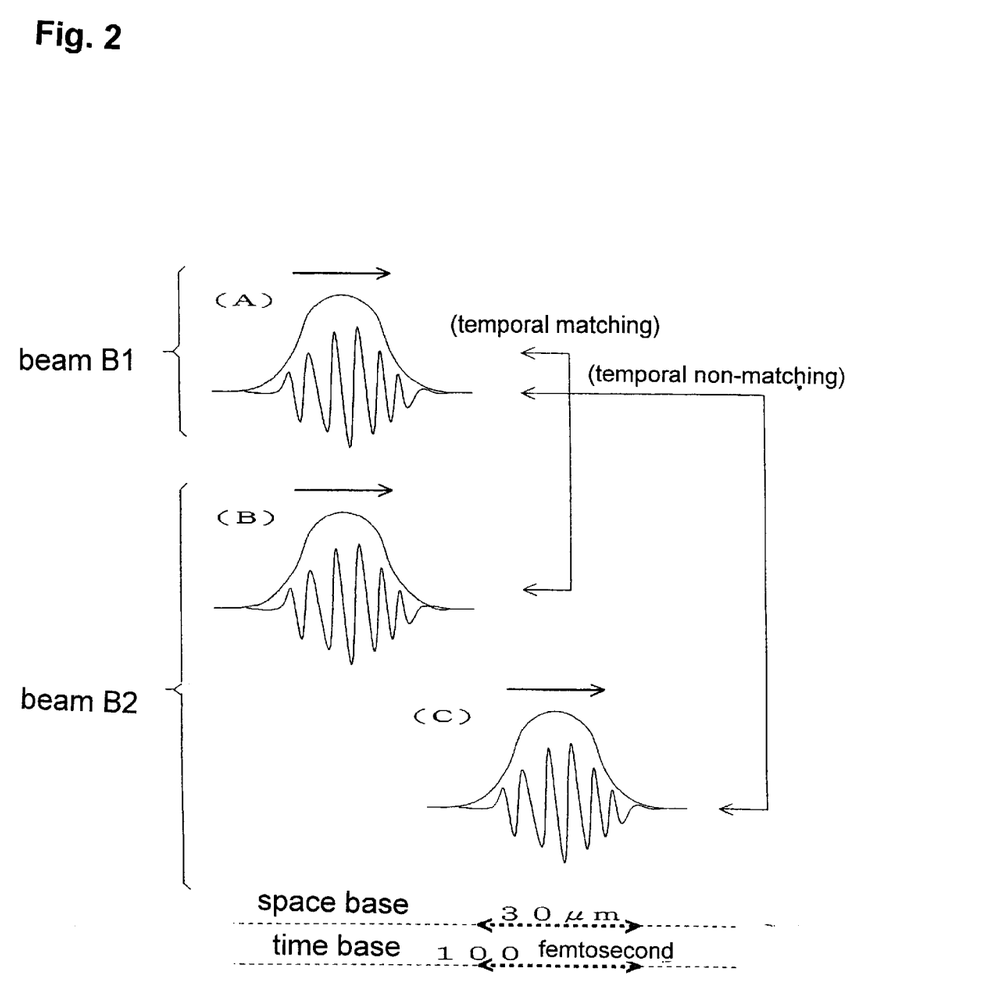
FIG. 2 is a conceptual diagram showing a temporal control of a converging position of two pulse beams B1 and B2.

FIG. 2 is a conceptual diagram showing a temporal control of a converging position of the beams B1 and B2. For example, 100 femtoseconds corresponds to a distance in vacuum pressure of 30 $\mu$m. That is, the beam exists only over a length of 30 $\mu$m. Further, when the laser wavelength is 0.8 $\mu$m, a pulse beam of 100 femtoseconds includes only 40 of peaks and valley. Thus, when the optical path difference between the beams B1 and B2 is not arranged in 30 $\mu$m or less, the two beam pulses will never be overlapped even if they are propagated through the same optical path. This means that the two beam pulses will never be matched temporally. The state when the beams B1 and B2 are not matched temporally is shown as (A) and (C) in FIG. 2, and the state when they are temporally matched is shown as (A) and (B) in FIG. 2

Figure 3:
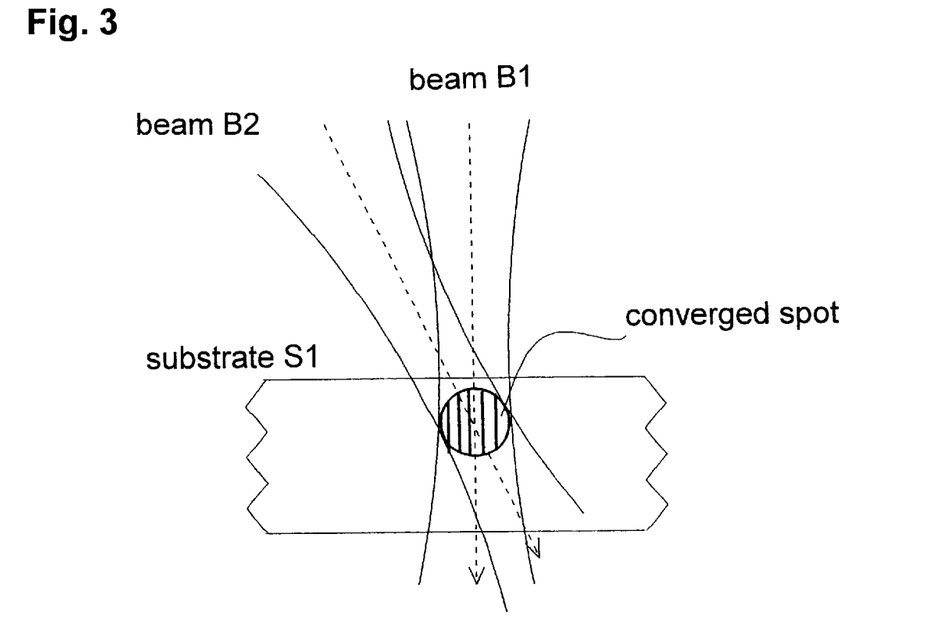
FIG. 3 is a conceptual diagram showing a spatial control of the converging position of the two pulse beams B1 and B2.

FIG. 3 is a conceptual diagram showing a spatial control of the converging position of the beams B1 and B2. If the beams B1 and B2 are temporally matched as shown in (A) and (B) of FIG. 2 at a converging point where the beam B1 spatially intersects with the beam B2 as shown in FIG. 3, the two beams interfere with each other. When an optical energy density of a bright region in an interference pattern generated from the above interference exceeds a hologram recording threshold in the substrate, the interference pattern is recorded as a refractive index modulation in the substrate.

In the production method of the present invention, by condensing beams at the surface of the substrate, a surface relief type hologram having a relief on the surface thereof and a surface type hologram having a refractive index modulation in the substrate may be formed. Further, by controlling the condensing to provide an interference fringe within the substrate, an bedded type volume hologram may be formed.

EXAMPLE

Example 1

Using the two-beam laser interference exposure optical system, a transmission type hologram was recorded in ambient air. A combination of the plane mirror M3' and lens L1 and a combination of the plane mirror M6' and lens L2 were used. A single crystal of sapphire (10×10×1 mm) was used as the substrate S1 for recording a hologram therein. A laser beam was entered perpendicular to the "c plane" of the sapphire single crystal. The pulse energies of the beam B1 and beam B2 were arranged in 0.7 mJ and 0.3 mJ, respectively, and thus the laser output was about 1 mj/pulse. Using a singe pulse, a hologram was recorded by converging each of the beams with a spot size of about 10 $\mu$m diameter.

Further, in order to bring the laser beam into a Gaussian distribution through a shaping process, an aperture control element Al was inserted in the optical path. As a result, the energy of the beams B1 and B2 necessary for recording a hologram could be reduced by 20%.

Figure 4:
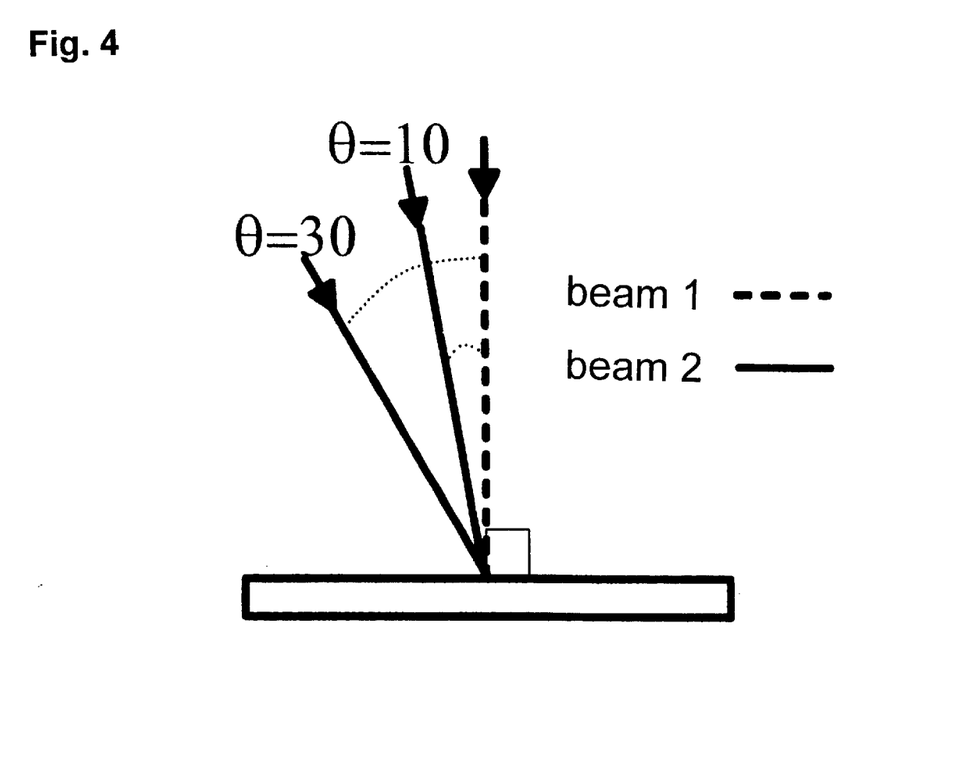
FIG. 4 is a conceptual diagram showing an incident angle to two laser beams in an example 1.
Figure 5:
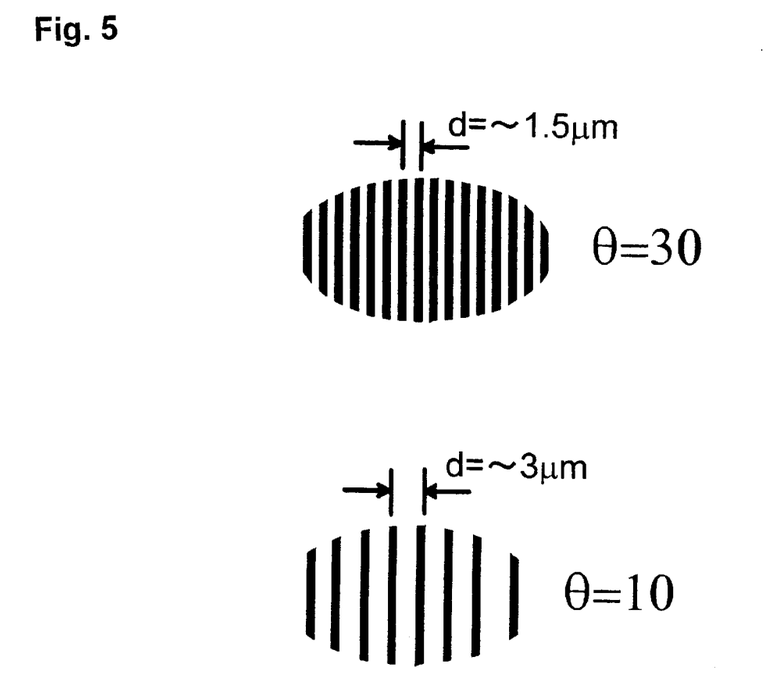
FIG. 5 is an enlarged plane view showing a pattern of a diffraction grating recorded in the example 1.

The beams B1 and B2 were exposed in two cases, i.e. at each angle θ between the beams B1 and B2 of 10 degrees and 30 degrees as shown in FIG. 4, and grating fringe distances of 1.5 μm and 3 μm was obtained from the two cases, respectively. The fringe distance d of the obtained diffraction grating could correspond to a value derived from the following formula by using a laser wavelength λ=800 nm and the refractive index of an air which gives n=1;

$$\lambda = n \cdot d \cdot \sin \theta/2$$

Figure 6:
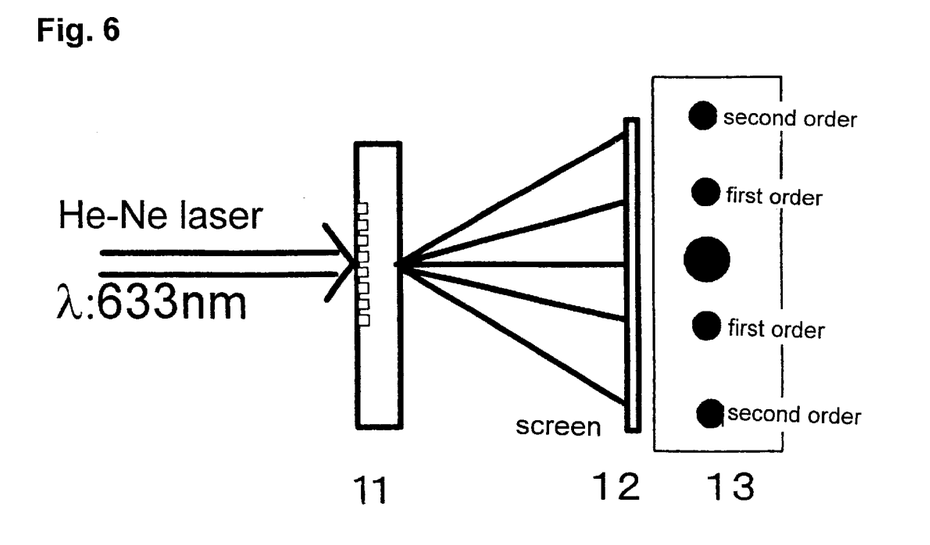
FIG. 6 is an enlarged plane view showing a diffraction pattern in a He-Ne laser using the diffraction grating recorded in the example 1.

It could also be confirmed that the resulting hologram was a surface relief type hologram from a measurement using an AFM. The area of the formed hologram was about 50 μm. Further, since the hologram may be recorded by a single pulse, the hologram in one sample could be extensively recorded within a pulse rate by moving the X-Y stage continuously. FIG. 6 shows a diffraction pattern 13 projected on a screen 12 when a He-Ne laser (λ=633 nm) was irradiated on the diffraction grating 11 obtained from this example. A diffracted light of a high order was observed in this diffraction pattern, and a first-order diffracted light was about 20%. Thus, it was proved that this diffraction grating could be applied to various diffraction optical components.

Example 2

Using the same two-beam laser interference exposure optical system as that of Example 1, a surface relief type hologram was recorded in a metallic film. In order to bring the laser beam into a Gaussian distribution through a shaping process, an aperture control element Al was inserted in the optical path. A metallic film formed on a glass through a vacuum deposition process and having a thickness of about 250 nm was used as the substrate for recording a hologram therein. After the shaping process, the pulse energies of the beams B1 and B2 were 0.13 mj and 0.07 mj, respectively. The angle θ between the two beams was 20 degrees. The fringe distance of the obtained diffraction grating could correspond to a value derived from the following formula by using a laser wavelength λ=800 nm and an air which gives n=1;

$$\lambda = n \cdot d \cdot \sin \theta/2$$

Example 3

Using the same two-beam laser interference exposure optical system as that of Example 1, a surface relief type hologram was recorded in a silica film. A SiO$_2$ thin film (film thickness: 114 nm) formed on a Si single crystal through a thermal oxidization was used as the substrate. The energy intensity of each of the beams B1 and B2 was 25 μj, and the beams B1 and B2 were converged with a diameter of about 100 μm on the surface. The angle between the two beams was 90 degrees, and a calculated fringe distance of the obtained diffraction grating was 580 nm.

Figure 7:
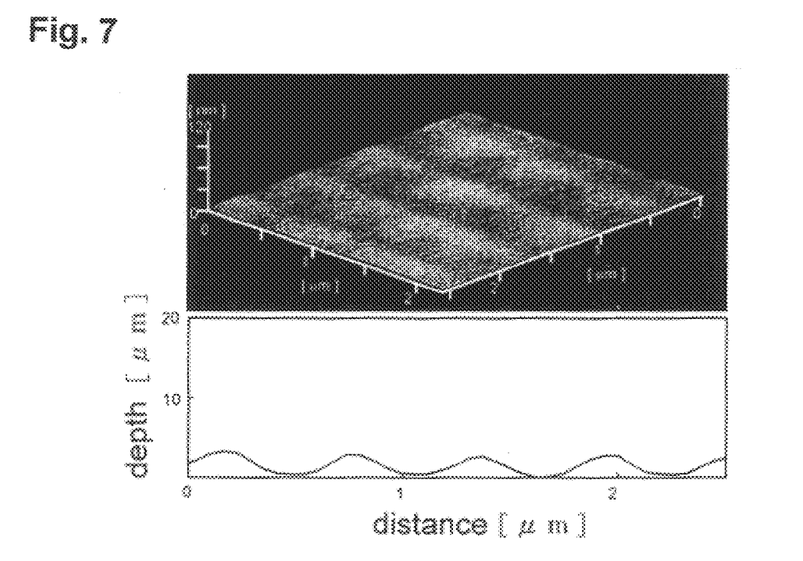
FIG. 7 is a photograph as a substitution for a drawing showing an AFM image of a diffraction grating recorded in an example 3.
Figure 8:
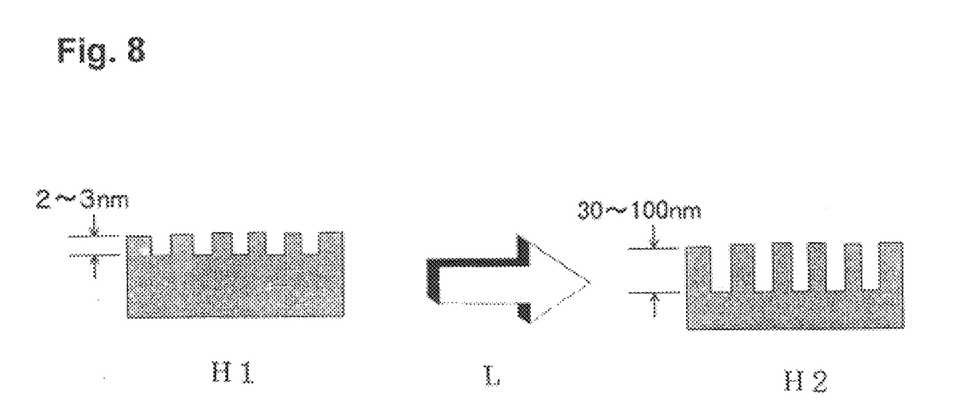
FIG. 8 is a conceptual drawing of a process of subjecting a hologram in the example 3 to a chemical etching.
Figure 9:
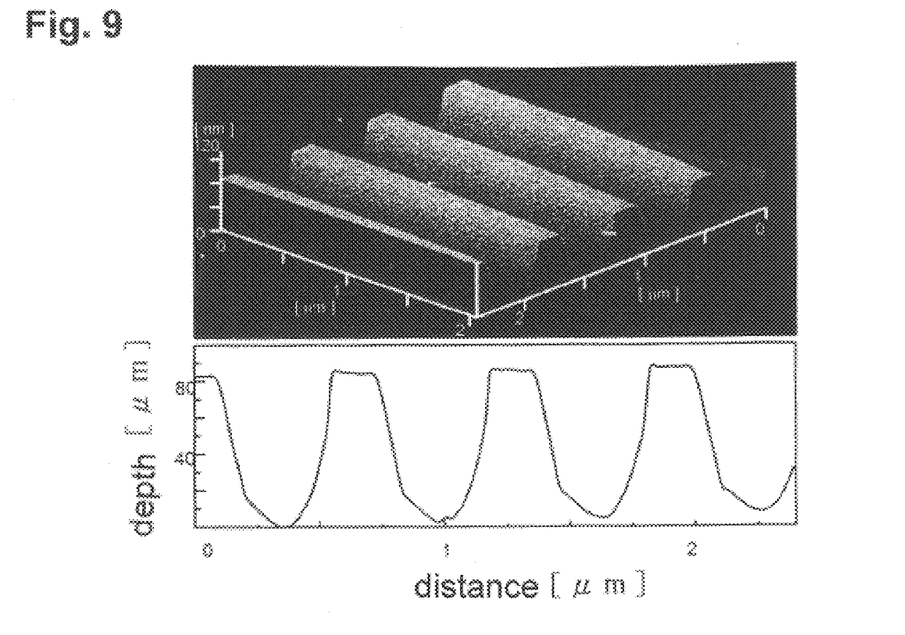
FIG. 9 is a photograph as a substitution for a drawing showing an AFM image of the etched hologram in the example 3.

FIG. 7 shows an AFM image of the obtained diffraction grating. From this AFM image, it could be confirmed that a surface relief type hologram having a groove depth of 2 to 3 nm and a groove distance of 580 nm was formed. The groove depth was 2 to 3% of the film thickness of the silica glass, and this value could correspond to a shrinkage percentage in connection with an optically induced structural change in the silica glass. FIG. 8 conceptually shows a process for subjecting the obtained hologram H1 to a chemical etching with an acid liquid L to provide a hologram H2 having an extended groove depth. The etching was performed using a solution including 1% of hydrofluoric acid for 5 minutes. FIG. 9 shows an AFM image of the hologram after the etching. From this AFM image, it could be confirmed that the groove depth was increased to 18 to 20 nm, and a diffraction grating having a high aspect ratio was obtained.

Example 4

Figure 10:
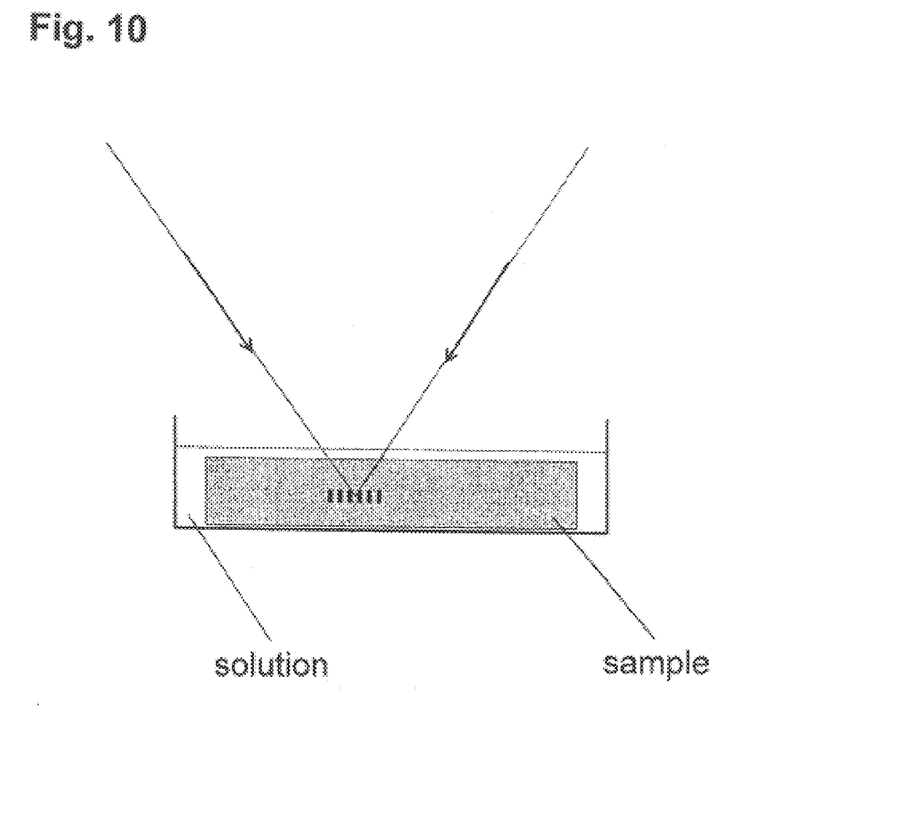
FIG. 10 is a conceptual drawing of a method in an example 4.

FIG. 10 shows a concept of a method in this example. As shown in FIG. 10, using the same two-beam laser interference exposure optical system as that of Example 1, a hologram was recorded in a silica glass immersed in a solution. The solution was selected from either one of water, hydrogen fluoride solution, acetone, ethanol, methanol, hydrochloric acid solution and nitric acid solution. The energy intensity of each of the beams B1 and B2 was 400 μj, and the colliding position of the two pulses was arranged within the substrate. When the laser beams were irradiated in ambient air under the same condition, certain damage was caused on the surface of the substrate by an abrasion arising from the irradiation. However, when the substrate was immersed in the solution, a diffraction grating could be formed only within the substrate with keeping the surface of the substrate flat. In particular, when using a solution including 1% of hydrofluoric acid, no processing distortion was detected in the silica glass.

Example 5

Figure 11:
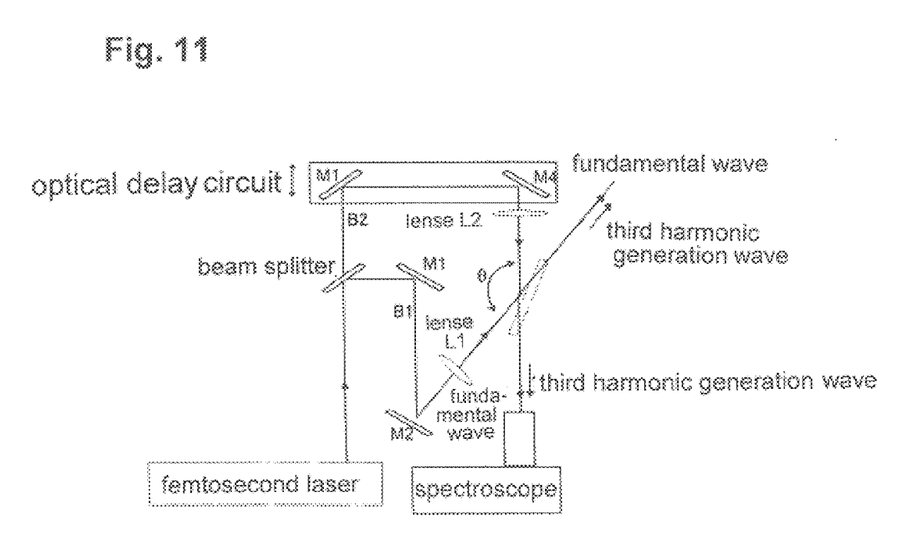
FIG. 11 is a conceptual drawing of a method in an example 5.

FIG. 11 shows a concept of a method in this example. As shown in FIG. 11, a pulse of a titanium-sapphire laser (wavelength: 800 nm, pulse width: 100 femtoseconds, pulse rate: 10 Hz) was divided into two beams B1 and B2, and the beams were collided in ambient air. The energy intensity of each of the beams was 0.75 mj. The angle between the beam B1 and B2 was varied in the range of 0 to 180 degrees. The mirrors M1 and M2 and the lenses L1 and L2 were finely adjusted to spatially match the two beams, and then the two beams were temporally matched by using the optical delay circuit. Spectrum of the pulse after the collision was examined by using a spectrometer.

When the two beams was matched spatially and temporally, a THG wave having a significantly higher intensity than that in the contrary case was observed. This proved that this phenomenon could be effectively utilized to detect the presence of the spatial and/or temporal matching of the two femtosecond pulse beams. This detection process is also effective to determine the time width of the femtosecond pulse.

Example 6

Using the same two-beam laser interference exposure optical system as that of Example 1, an embedded type hologram was recorded in a diamond. In order to bring the laser beam into a Gaussian distribution through a shaping process, an aperture control element Al was inserted in the optical path. A natural diamond (Type IIa, SAWN cut, optical absorption end: 220 nm) was used as the substrate S1, and the size of the substrate was 3×3×0.5 mm. The pulse energies of the beams B1 and B2 were 0.14 mJ and 0.06 mJ, respectively. The two beams were converged within the substrate S1 with a diameter of about 100 μm. When the angle θ between the beams B1 and B2 was 10 degrees, an embedded type hologram could be formed at a position inward about 1 μm from the surface of the substrate S1 with a fringe distance of about 3 μm.

From the measurement using an AFM, it could be observed that the surface of the substrate was kept flat. It could also be confirmed that a graphite carbon was formed by the Raman scattering at the region having the formed diffraction grating. A diffraction efficiency of about 20% was obtained by irradiating a He-Ne laser. In view of the above results, it could be proved that this hologram could be applied to various embedded type diffraction optical components. It could also be proved that this hologram could be applied to an anti-fake hologram.

Example 7

Figure 12:
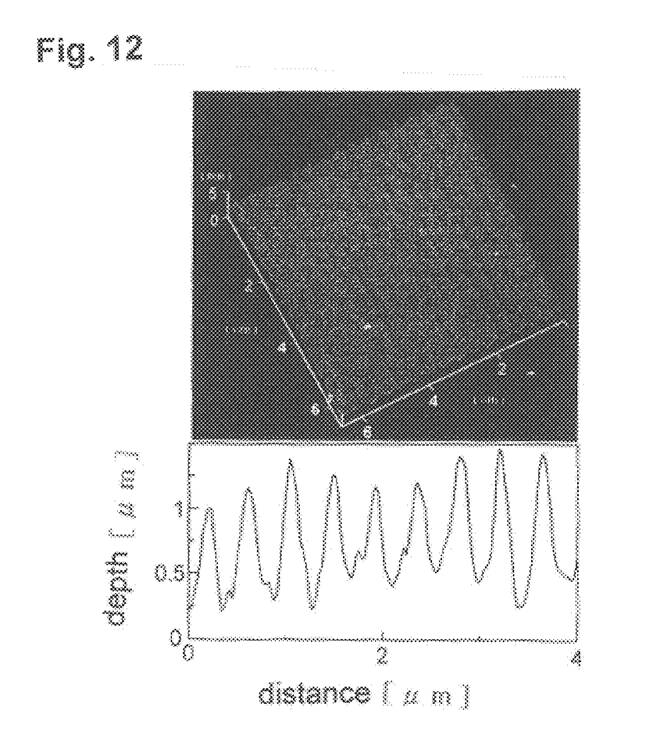
FIG. 12 is a photograph as a substitution for a drawing showing an AFM image of a hologram in an example 7.

With incorporating the two beams matching detect process in the two-beam laser interference exposure optical system of Example 1, a hologram was recorded in a silica glass film formed by subjecting a Si substrate to a thermal oxidization process. The pulse energy of each of the beams B1 and B2 was 20 μJ, and the angle between the two beams was 158 degrees. The two beams were converged on the surface of the substrate S1 with a diameter of about 100 μm. A diffraction grating having a groove distance of 430 nm could be confirmed from an AFM image shown in FIG. 12.

INDUSTRIAL APPLICABILITY

A hologram obtained from the production method of the present invention is useful for diffraction gratings in the fields of optical information communication and optical memory technologies. A specific application may include optical elements using a surface relief type hologram, such as an optical wavelength dividing element and optical polarization element, or any optical device using such an element; or optical elements using a volume hologram, such as an embedded type optical wavelength dividing element, optical polarization element and optical wavelength output equalization element, or any optical device using such an element.

The specific application may also include surface relief type holograms or volume holograms for ornament, marking or anti-fake. Further, a multiplex hologram recording medium and a quasi-phase-matched (QPM) higher-harmonic wave generating element be exemplified, and any device using such an element may be exemplified.

Furthermore, the specific application may include a distributed Bragg reflector (DBR) type or distributed feedback (DFB) type leaser device using as a polarization element a hologram obtained by the method of the present invention, by use of a laser medium including a composition selected from the group consisting of diamond, sapphire, alumina, and glass consisting of the composition including at least either one of $Al_2O_3$ and $SiO_2$, wherein the laser device generates a beam based on an inherent emission, or an emission yielded from inherent defects or added impurities.

What is claimed is:

1. A method for producing a hologram using a two-beam laser interference exposure process, said method comprising the steps of:
   using as a light source a femtosecond laser having a pulse width of 900–10 femtoseconds and a peak output of 1 GW or more, and capable of generating a pulse beam at or close to the Fourier transform limit;
   dividing the pulse beam from said laser into two by a beam splitter;
   controlling said two beams temporally through an optical delay circuit and spatially using plane and concave mirrors each having a finely rotatable reflection surface; and
   converging said two beams on a surface of or within a substrate for recording a hologram at an energy density of 100 $GW/cm^2$ or more with keeping each polarization plane of said two beams in parallel so as to match the converged spot of said two beams temporally and spatially,
   wherein a hologram is recorded irreversibly on said substrate formed of a transparent material, semiconductor material or metallic material, based on a relief in the configuration of the surface of said substrate and/or a variation in the refractive index of said substrate in connection with an abrasion of said substrate or a structural change in the atomic arrangement of said substrate caused by the high-density energy irradiation.

2. A method for producing a hologram using a two-beam laser interference exposure process as defined in claim 1, wherein each position of said mirrors is finely moved in the vertical direction of each reflection surface of said mirrors and in the parallel and vertical directions of each incident beam to vary each optical path length of said two beams, so as to serve as said optical delay circuit.

3. A method for producing a hologram using a two-beam laser interference exposure process as defined in claim 1, wherein said energy density is arranged just below a threshold at which an abrasion is caused in said substrate, to modulate the refractive index of said substrate itself with keeping the surface of said substrate in a flat configuration, so as to form a surface type hologram.

4. A method for producing a hologram using a two-beam laser interference exposure process as defined in either one of claims 1 to 3, wherein said substrate is formed of a silica glass or a silica glass including germanium, wherein said energy density is arranged in the range of a threshold at which the structural change of said substrate is optically induced to a threshold at which an abrasion is caused in said substrate, so as to form a surface type hologram based on the volume change of said substrate in connection with said optically induced structural change.

5. A method for producing a hologram comprising subjecting a surface type hologram produced by the method as defined in any one claim of claims 1 to 3, to a chemical etching so as to increase the depth of the relief of the surface thereof.

6. A method for producing a hologram using a two-beam laser interference exposure process as defined in claim 1, wherein the incident position and incident angle of the two beams each incident from the same direction into said substrate are adjusted to form a transmission type hologram having an adjusted position in the depth direction of said substrate and an adjusted surface area.

7. A method for producing a hologram using a two-beam laser interference exposure process as defined in claim 1, wherein a converging position of the two beams opposedly incident into said substrate and a size of a converged spot of said two beams are arranged within said substrate by controlling said optical delay circuit and said mirrors, so as to form an embedded reflection type hologram embedded within said substrate and having an adjusted position in the depth direction of said substrate and an adjusted surface area, wherein the time width of the laser pulse is controlled to form an embedded reflection type hologram additionally having an adjusted total hologram thickness.

8. A method for producing a hologram using a two-beam laser interference exposure process as defined in claim 1, wherein an in-depth position of a hologram within said substrate is varied by controlling a converging position of the two beam opposedly incident into said substrate by use of said optical delay circuit and said mirrors, to embed a plurality of holograms in the depth direction of said substrate, so as to provide a multiplex hologram recording medium.

9. A method for producing a hologram using a two-beam laser interference exposure process as defined in claim 1, wherein said substrate is formed of a transparent crystal or a glass having no in version symmetry property, wherein said substrate is adjusted in temperature and is quasi-phase-matched with applying an electric field to form a domain inverted grating.

10. A method for producing a hologram using a two-beam laser interference exposure process as defined in claim 1, wherein said substrate is formed of a material transparent to visible light, selected from the group consisting of quartz, glass, sapphire, $LiNBO_3$, $LiTaO_3$, $ZrO_2$, $CaF_2$, diamond and acrylic resin, or a semiconductor material selected from the group consisting of silicon, Ge, GaAs, AlN, InP, GaN, ZnS, ZnSe, ZnO, SiC and any mixed crystal thereof, wherein the formed hologram is either one of a surface relief type hologram, a surface type hologram and a volume hologram.

11. A method for producing a hologram using a two-beam laser interference exposure process as defined in claim 1, wherein said substrate is formed of a metallic material selected from the group consisting of gold, silver, platinum, copper, nickel, chromium, aluminum, cadmium, tantalum, super-hard metal and metal silicon, or a semiconductor material selected from the group consisting of silicon, Ge, GaAs, AlN, InP, GaN, ZnS, ZnSe, ZnO, SiC and any mixed crystal thereof, wherein the formed hologram is a surface relief type hologram.

12. A method for producing a hologram using a two-beam laser interference exposure process as defined in claim 1, wherein said substrate is kept under vacuum during the exposure.

13. A method for producing a hologram using a two-beam laser interference exposure process as defined in claim 1, which further includes the steps of producing a plurality of identical or different holograms by use of a plurality of laser pulses, and superposing the holograms produced by each of said pulses.

14. A method for producing a hologram using a two-beam laser interference exposure process as defined in claim 1, wherein the polarization pane of each laser pulse is rotated, or said substrate is rotated with fixing said the polarization pane.

15. A method for producing a hologram using a two-beam laser interference exposure process as defined in claim 1, wherein said substrate is moved in parallel during the irradiation of each laser pulse.

16. A method for producing a hologram using a two-beam laser interference exposure process as defined in claim 1, which further including the step of immersing said substrate into a solution having a refractive index close to that of said substrate or applying said solution onto the surface of said substrate, to form an anti-reflection film on the surface of said substrate.

17. A hologram formed irreversibly on a transparent composition transparent to visible light, semiconductor material or metal by use of the method as defined in any one claim of claims 1 to 3, and 6 to 16.

18. A distributed Bragg mirror (DBR) type or distributed feedback (DFB) type laser comprising:

a diffraction grating composed of the hologram as defined in claim 17; and a laser medium selected from the group consisting of diamond, alumina, sapphire, and glass consisting of the composition including at least either one of $Al_2O_3$ and $SiO_2$, wherein said laser generates a beam based on an inherent emission yielded from exciton effects and optical inter-band transitions, an emission yielded from inherent defects, or an emission yielded from added impurities.

19. An apparatus for producing a hologram using the two-beam laser interference exposure process as defined in claim 1, said apparatus comprising:

a light source of a femtosecond laser;

a beam splitter for dividing a pulse beam from the laser into two pulse beams; and an optical system including an optical delay circuit for temporally controlling a converging position of the pulse beams, plane and concave mirrors for spatially controlling said position, and a mechanism for finely rotating said mirrors.

20. An apparatus for producing a hologram as defined in claim 19, which further includes an aperture control element for shaping the laser beam into a Gaussian pulse to lower a threshold on the formation of the hologram.

21. An apparatus for producing a hologram as defined in claim 19 or 20, which further includes means for detecting the temporal and spatial matching of the two beams using a Third Harmonic Generation wave or Third Sum-Frequency Generation wave from a femtosecond laser beam based on the nonlinear property of air.

* * * * *